United States Patent
Clarke et al.

(10) Patent No.: US 9,628,010 B2
(45) Date of Patent: Apr. 18, 2017

(54) POWER DISTRIBUTION SYSTEMS COMPRISING VARIABLE FREQUENCY AC GENERATOR

(71) Applicant: GE ENERGY POWER CONVERSION TECHNOLOGY LTD., Warwickshire (GB)

(72) Inventors: Nicholas James Clarke, Leicestershire (GB); Jonathon Childs, Warwickshire (GB)

(73) Assignee: GE Energy Power Conversion Technology LTD. (GB)

( * ) Notice: Subject to any disclaimer, the term of this patent is extended or adjusted under 35 U.S.C. 154(b) by 670 days.

(21) Appl. No.: 13/932,289

(22) Filed: Jul. 1, 2013

(65) Prior Publication Data

US 2014/0008988 A1     Jan. 9, 2014

(30) Foreign Application Priority Data

Jul. 6, 2012   (EP) .................................... 12175427

(51) Int. Cl.
*H02P 9/04*     (2006.01)
*H02J 3/40*     (2006.01)
(Continued)

(52) U.S. Cl.
CPC .............. *H02P 9/04* (2013.01); *B63H 23/24* (2013.01); *H02J 3/40* (2013.01); *H02J 3/46* (2013.01);
(Continued)

(58) Field of Classification Search
None
See application file for complete search history.

(56) References Cited

U.S. PATENT DOCUMENTS 4,410,848 A * 10/1983 Frierdich ................ H02P 9/107
322/25
4,587,436 A *  5/1986 Cronin .................... H02P 9/307
307/10.1

(Continued)

FOREIGN PATENT DOCUMENTS

DE    WO 2011092330 A2 *  8/2011  .............. B60L 11/08

OTHER PUBLICATIONS

"Alternator", Jun. 21, 2012, Wikipedia, as retrieved from archive.org/web at <http://web.archive.org/web/20120621142258/https://en.wikipedia.org/wiki/Alternator>.*

Primary Examiner — Rexford Barnie
Assistant Examiner — David Shiao
(74) Attorney, Agent, or Firm — Wood IP LLC

(57) ABSTRACT

A power distribution system is described that does not rely on a fixed frequency and which therefore allows prime movers to run at different speeds in response to load demand, typically so that fuel consumption and/or harmful exhaust emissions is/are minimised. A marine power distribution and propulsion system can include an ac busbar adapted to carry a variable-frequency ac distribution voltage. A plurality of ac generators are connected to the busbar, each having an associated prime mover such as a diesel engine, turbine etc. A power management controller is adapted to vary the rotational speed of the prime movers with reference to the electrical load on the ac busbar such that the generators provide a variable frequency output during normal operation of the power distribution system. Such operation is to be contrasted with conventional distribution systems which have a fixed frequency.

18 Claims, 12 Drawing Sheets

(51) Int. Cl.
*H02J 3/46* (2006.01)
*B63H 23/24* (2006.01)

(52) U.S. Cl.
CPC ........ *Y10T 307/718* (2015.04); *Y10T 307/724* (2015.04)

(56) References Cited

U.S. PATENT DOCUMENTS

| | | | | |
|---|---|---|---|---|
| 5,764,502 A | * | 6/1998 | Morgan | H02J 4/00 307/66 |
| 8,299,638 B2 | * | 10/2012 | Sandoy | B63H 23/24 290/4 R |
| 2009/0184575 A1 | | 7/2009 | Armstrong et al. | |
| 2009/0278362 A1 | * | 11/2009 | Inagawa | B60L 11/00 290/40 B |
| 2010/0094490 A1 | * | 4/2010 | Alston | B63H 21/17 701/21 |
| 2012/0059555 A1 | * | 3/2012 | Bixel | B66C 13/22 701/50 |
| 2012/0302112 A1 | * | 11/2012 | Hartig | B60L 11/08 440/6 |
| 2013/0200691 A1 | * | 8/2013 | Crane | B63H 23/24 307/9.1 |

\* cited by examiner

POWER DISTRIBUTION SYSTEMS COMPRISING VARIABLE FREQUENCY AC GENERATOR

FIELD OF THE INVENTION

The present invention relates to power distribution systems, and in particular to power distribution systems that are designed to operate with a variable system frequency depending on load demand. The present invention can optionally be implemented as a marine power distribution and propulsion systems that can be installed in any suitable marine vessel, either civilian or military.

BACKGROUND OF THE INVENTION

Power distribution systems are well known. In a typical arrangement of a marine power distribution and propulsion system shown in FIG. 1 a plurality of ac generators G1 . . . G4 provide ac power to a busbar or switchboard 2 which carries a distribution voltage such as 690 V. Each generator G1 . . . G4 is coupled to a prime mover such as a diesel engine D1 . . . D4.

Electric propulsion motors M1 . . . M4 are connected to the busbar 2 by means of interposing power converters 4. The propulsion motors M1 . . . M4 can be of any suitable type and construction and can optionally be configured to drive a propeller shaft or other propulsion system such as a thruster.

In some arrangements then active front end (AFE) power converters can be used. An AFE power converter typically includes a first active rectifier/inverter 6 having ac terminals connected to the busbar 2 and a second active rectifier/inverter 8 having ac terminals connected to the propulsion motor M1 . . . M4. The dc terminals of the first and second active rectifier/inverters 6, 8 are connected together by a dc link 10. A harmonic filter 12 is normally connected to the ac terminals of the first active rectifier/inverter 6, i.e. on the network-side, to ensure harmonic voltages and currents are eliminated. The AFE power converters might, for example, be implemented as MV3000 converters supplied by GE Energy Power Conversion UK Ltd of Boughton Road, Rugby, United Kingdom.

In normal operation, the first active rectifier/inverter 6 will operate as an active rectifier to supply power to the dc link 10 and the second active rectifier/inverter 8 will operate as an inverter to supply power to the associated propulsion motor M1 . . . M4. However, reverse operation can be possible in certain circumstances such as regenerative braking for the propulsion motors M1 . . . M4.

Each active rectifier/inverter 6, 8 will typically have a suitable topology with semiconductor power switching devices fully controlled and regulated using a pulse width modulation (PWM) strategy.

The busbar 2 can be equipped with protective switchgear with circuit breakers and associated controls. The busbar 2 will typically be divided into a pair of busbar sections 2a, 2b (e.g. port and starboard) that are interconnected by a tie 14. The actual arrangement of the power distribution system will typically depend on redundancy, which is particularly important for marine vessels.

The generators G1 . . . G4 and power converters 4 can be connected to the busbar 2 by circuit breakers 16, 18 and associated controls or other switching means.

A conventional power distribution system can have any suitable number and type of generators and any suitable busbar configuration depending on the power generation and distribution requirements.

In a conventional power distribution system the busbar 2 carries a fixed-frequency distribution voltage, typically 50 or 60 Hz. The frequency of the output voltage of each generator G1 . . . G4 is determined by its shaft speed and must be maintained at the nominal frequency of the power distribution system by the diesel engines D1 . . . D4. For example, a four-pole generator must be maintained at 1500 rpm or 1800 rpm if its output voltage is to have a frequency of 50 or 60 Hz, respectively, to match the particular system frequency.

More generally, the following formula can be used to determine the rotational speed of a prime mover (and hence the rotor of the generator to which it is coupled) for a given system frequency:

$$N = 120 \times F/P \qquad (EQ1)$$

where:
N is the rotational speed of the prime mover in rpm (or shaft speed),
F is the system frequency in Hz, and
P is the number of generator poles.

It will therefore be readily appreciated that any function that controls the rotational speed of the prime mover can also be considered in terms of a frequency control function and vice versa.

With reference to FIGS. 2 and 3, each diesel engine D1 . . . D4 is typically provided with an electronic speed controller 20 (often called a governor) to regulate its rotational speed. The speed controller 20 varies the output torque of the diesel engine automatically in response to detected changes in the shaft speed by controlling the fuel delivery system of the diesel engine, e.g. by opening and closing the fuel rack actuator 22 or by varying the air flow/injector duty-cycle on common rail diesel engines.

As the load demand on the busbar 2 changes then the mechanical torque requirement on the generators G1 . . . G4 will change accordingly. The shaft speed of each generator G1 . . . G4 is monitored and the speed signal is compared against a speed reference or setpoint as described in more detail below. Any deviation from the speed reference is detected by the associated speed controller 20 and the fuel delivery system 22 can be controlled accordingly. For example, if the shaft speed of the first generator G1 decreases then more fuel can be delivered so that the output torque of the associated diesel engine D1 is increased to meet the required load torque or vice versa to restore the shaft speed (and hence the frequency of the generator output voltage) to the nominal. Each speed controller 20 can therefore be considered as a closed-loop regulator.

If just a single generator is connected to a large supply network such as a utility grid (e.g. a so-called 'infinite network') and the system frequency falls due to high load demand then the speed controller in its basic form would simply increase its speed reference in an attempt to restore the system frequency to nominal. In practice, the system frequency is not influenced by the generator and the speed controller would simply go to its maximum setting and the generator would most likely trip on overload. If the system frequency increases due to reduced load demand then the fuel delivery system would most likely be reduced to zero.

The same situation occurs when two or more generators are connected to operate in parallel with each other. In this case the system characteristic will be somewhere between an infinite network and a single-connected generator.

To enable stable parallel operation of the generators G1 . . . G4, each speed controller 20 includes a speed droop control function which has the effect of reducing the speed reference as the active power (kW) or load increases or vice versa. By operating in this manner it is possible to achieve stable load sharing between parallel-connected generators or with an infinite network. The active power produced by each generator G1 . . . G4 is monitored by the associated speed controller 20 by means of a transducer in the busbar 2 which converts the load signal to an active power feedback signal kWf. The active power feedback signal kWf is converted to a speed signal by a controller K which is then subtracted from an initial speed error signal $\delta N1$ (i.e. the difference between a speed feedback signal Nf that is derived directly from the shaft speed and the speed reference or setpoint Ns that is applied by the power management controller 24—see below) in order to modify the shaft speed of the associated diesel engines D1 . . . D4 for the given active power. In particular, the resulting second speed error signal $\delta N2$ is used by the speed controller 20 as a speed reference to control the fuel delivery system 22 of the diesel engine.

A typical value of droop is 3-5% which means that the shaft speed will fall between 3-5% for an increase in generator load from zero to rated load. The amount of droop applied is set at the speed controller 20 by means of an internal gain in the controller K.

FIG. 4 shows how speed droop control can be applied to a single generator where an increase in the speed reference causes a corresponding increase in the speed of the generator and vice versa and where generator speed falls as load increases or vice versa. Note that as mentioned briefly above: Droop (%)=100×(No load speed−Full load speed)/No load speed. FIG. 5 shows how two parallel-connected generators A and B with identical speed references and speed droop control will share the load equally (PA=PB=½AB). Both generators are locked in synchronisation and their speeds are therefore identical. The common speed N (and hence the system frequency) is at the point where the two droop lines intersect. Finally, FIG. 6 shows the effect of changing the speed reference for one of the parallel-connected generators. An increase in the speed reference for generator B will cause its speed to increase from N to N' with generator B taking a greater share of the load (P'B) and generator A taking a smaller share of the load (AP'). The system frequency can be restored back to nominal by simultaneous reduction in the speed references for generators A and B.

A power management controller (or power management system (PMS)) 24 can be used to coordinate the operation of the diesel engines D1 . . . D4, and in particular the adjustment of the speed reference Ns to ensure that the generators G1 . . . G4 take equal amounts of active power in proportion to their output (or 'nameplate') rating.

Ensuring that the generators G1 . . . G4 are loaded equally allows the power management controller 24 to apply a start/stop control function where generators are connected to, or disconnected from, the busbar 2 to meet changing load demands. For example, the power management controller 24 can initiate the starting of one or more additional generators and connect them to the busbar (i.e. bring them on-line) if the loading on any one of the connected generators exceeds a pre-determined threshold, e.g. 90% of its output rating. The power management controller 24 can also initiate the disconnection and shutdown of one or more generators if the loading on any of the connected generators falls below a pre-determined threshold, e.g. 30% of its output rating. In the case of a marine power distribution and propulsion system then the thresholds can be determined with reference to the overall power requirements of the marine vessel (e.g. its intended purpose or duty), but any power distribution system should ensure that a sufficient margin of spare capacity—otherwise known as the 'spinning reserve'—is maintained. This allows the power distribution system to meet any sudden increases in load demand, and to prevent the unnecessary starting and stopping of generators in response to minor changes in load demand which might occur during normal operation.

The power management controller 24 can include generator-specific control functions (i.e. those control functions that are applied to each individual generator or its associated prime mover) and common control functions that are applied to all of the generators. In FIGS. 2 and 3 the generator-specific control functions are grouped together in a generator-specific controller 26 while the common control functions are grouped together in a common controller 28.

It will be readily appreciated that the common control functions include the start/stop control function described above, together with other functions such as the automatic removal or load-shedding of non-essential loads under overload conditions etc. However, for clarity only a load sharing control function and an operator control function are shown in FIG. 3 for a single generator G1 and its associated diesel engine D1.

The load sharing control function uses information data indicative of the number of generators that are on-line, their kW rating, their actual loading—to determine the total system load, together with other operational parameters of the power distribution system such as the number of operational busbar sections and the open/closed status of the circuit breakers ('CB STATUS') or protective switchgear. This information data is provided to a load share function block 30 which calculates an active power (kW) reference or setpoint kWs and a reactive power (kVAr) reference or setpoint (not shown in FIGS. 2 and 3) based on the power distribution system configuration. The active power and reactive power references are distributed for use in the generator-specific controllers 26 of the power management controller 24.

The operator control function uses data from a human machine interface (HMI) which can be in the form of a workstation 32 and which allows an operator to make changes to the operational parameters of the power distribution system such as manually starting or stopping, synchronising or disconnecting generators, modifying the voltage and frequency references or setpoints etc. The operator control function shown in FIG. 3 is a frequency control function which allows the operator to modify the system frequency. A frequency reference Fs is normally set to 50 or 60 Hz which equates to the nominal speed of the associated generator—see equation EQ1 above—and is only changed during commissioning of the power distribution system or in extreme cases where a change in system frequency is needed due to a reduction in engine performance, e.g. a reduction in transient load performance. A frequency feedback signal Ff is derived at the generator output and is filtered by a simple first-order filter 34 to remove noise and averaged by a moving average filter 36. The frequency reference Fs set by the operator is compared against the averaged frequency feedback signal $Ff_{av}$ and the resulting frequency error signal $\delta f$ is applied to a deadband function block 38, typically set at about 0.2 Hz. The output of the deadband function block 38 is a frequency control signal δf1 that is distributed for use in the generator-specific controller 26 of the power management controller 24.

The generator-specific control functions will now be described. Although FIG. 3 only shows the generator-specific controller for the first generator G1 it will be readily appreciated that corresponding control functions will be provided for each of the remaining generators G2 . . . G4 and will use feedback signals derived at the output of the respective generator as shown in FIG. 2.

An active power feedback signal kWf is derived at the output of the respective generator and is filtered by a simple first-order filter 40 to remove noise and averaged by a moving average filter 42. (It will be readily appreciated that averaging the active power and frequency feedback signals kWf and Ff is important because it allows transients to be ignored.)

The averaged active power feedback signal $kWf_{av}$ is compared against the active power reference kWs that is provided by the function block 30 and the resulting active power error signal δkW is applied to a function block 44 which converts the error signal to a second frequency error signal δf2 with reference to the droop characteristic ($e_{kW}$) of the speed controller 20. The first and second frequency error signals δf1 and δf2 are summed to give a combined frequency error signal δfc which is multiplied in a function block 46 by the droop characteristic ($e_{kW}$) of the speed controller 20 to convert it back to an active power error signal. It will be noted that the first frequency error signal δf1 is also distributed to the other generator-specific controllers 26 to make sure that the desired system frequency is achieved without affecting the kW load balance between the parallel-connected generators G1 . . . G4.

The active power error signal from the function block 46 is then applied to a deadband function block 48 before being converted to speed raise or lower command signals by function block 50. These command signals are provided to the speed controller 20 of the respective diesel engine D1 . . . D4 which incorporates an internal ramp function R shown in FIG. 3 that converts the digital pulses to an analogue speed reference or setpoint Ns. It will be noted that the duration of the speed raise or lower command signals from each generator-specific controller 26 is matched to the acceleration or deceleration rate of the speed controller 20, which is itself matched to the actual acceleration or deceleration rate of the respective diesel engine. This ensures accurate speed and power control of the diesel engines D1 . . . D4 for the purposes of maintaining the correct active power load sharing of individual generators, and frequency control across the common busbar or switchboard thereby negating the speed droop effect of the speed controllers.

As shown in FIG. 7 the efficiency of a fixed-speed diesel engine varies with load. More particularly, the higher the load the lower the specific fuel oil consumption (SFOC) of the diesel engine (or the corresponding measure for any other type of prime mover). This highlights a particular weakness in conventional power management controllers where the connection of additional generators to meet increasing load demands reduces the operational efficiency of the on-line generators, thus reducing the overall efficiency of the power distribution system.

FIG. 7 also shows that for a particular operating load there is an optimum speed setting to minimise fuel oil consumption. An extreme example would be running a diesel engine at 100% rated speed at 20% load. In this instance the SFOC would be in the region of 270 g/kWh. Running the diesel engine at 50% rated speed for the same load would reduce the SFOC to about 230 g/kWh—resulting in a 15% reduction in fuel oil consumption. A reduction in SFOC also corresponds to a reduction in environmentally harmful exhaust gases such as nitrogen oxides ($NO_x$), carbon dioxide ($CO_2$) and other pollutants related to the combustion process. However, such a speed reduction is not possible during normal operation of a conventional power distribution system which operates at a fixed nominal frequency.

It can therefore be seen that there is a need for a more efficient power distribution system.

SUMMARY OF THE INVENTION

The present invention provides a power distribution system that does not rely on a fixed frequency and which therefore allows the prime mover(s) to run at different speeds in response to load demand, typically so that fuel consumption and/or harmful exhaust emissions is/are minimised.

More particularly, the power distribution system comprises:
  an ac busbar adapted to carry a variable-frequency ac distribution voltage;
  an ac generator connected to the ac busbar and having an associated prime mover (e.g. a diesel engine, turbine etc.); and
  a power management controller adapted to vary the rotational speed of the prime mover with reference to the electrical load on the ac busbar such that the ac generator provides a variable frequency output during normal operation of the power distribution system.

The present invention further provides a method of operating a power distribution system comprising an ac busbar adapted to carry a variable-frequency ac distribution voltage, and an ac generator connected to the ac busbar and having an associated prime mover (e.g. a diesel engine, turbine etc.);
  the method comprising the step of:
  varying the rotational speed of the prime mover with reference to the electrical load on the ac busbar such that the ac generator provides a variable frequency output during normal operation of the power distribution system.

Further details of the power distribution system and its method of operation are set out below.

The power distribution system can have any suitable number and type of generators and associated prime movers, and any suitable busbar configuration, depending on the power generation and distribution requirements. The busbar can be equipped with protective switchgear with circuit breakers and associated controls. The busbar can be divided into busbar sections.

The power distribution system can carry any suitable distribution voltages, for example between 440 V and 15 kV.

As mentioned above, it will be readily appreciated that controlling the speed of the prime mover also controls the output frequency of the associated generator, which in practice must be matched to the frequency of the ac distribution voltage (i.e. the system frequency). The present invention can therefore also be expressed in terms of the power management controller being adapted to vary the system frequency with reference to the electrical load on the busbar or switchboard. As described in more detail below, if the load on the busbar changes then a new system frequency is selected and the speed of each prime mover is automatically varied by the power management controller so that the frequency of the output voltage of the associated generator matches the new system frequency. In direct contrast to conventional power distribution systems where the busbar carries a fixed-frequency distribution voltage, each generator of the power distribution system of the present invention provides a variable frequency output during normal operation. It is important to stress that in the present invention the automatic variation in the speed of each prime mover that happens under the control of the power management system is a change in its nominal speed and is not simply a transient speed change that might arise due to other operational factors.

Each prime mover can have a speed controller that controls its rotational speed based on a speed reference or setpoint. The power management controller can therefore determine the speed of the prime mover (and hence the output frequency of the associated generator) by adjusting or varying its speed reference.

The power management controller can adjust the speed reference that is used by each speed controller in a similar manner to that described above with reference to the conventional power distribution system, but it is expected that the speed of each prime mover will be able to be adjusted or varied over a wider range. For example, most conventional speed controllers will have a speed adjustment range of ±10% of rated speed, which for fixed-frequency applications is used to restore the system frequency back to nominal, i.e. to negate the effects of speed droop which would occur when the associated generator is on load. This is shown in FIGS. 4, 5 and 6. In the case of the present invention, each speed controller will typically operate over a wider speed range, e.g. between −25% and +10% of rated speed. Even wider speed ranges might be possible by implementing an additional speed input to each speed controller as opposed to relying on conventional speed raise or lower command signals in order to raise or lower the speed reference or setpoint. As described above, such speed raise or lower command signals are typically digital pulses provided to each speed controller from the power management controller and are converted to an analogue speed reference or setpoint by a ramp function which typically forms part of the speed controller.

The power management controller can have two control functions, namely a speed control function and an optional load sharing function if two or more generators are connected to the busbar in parallel.

The speed control function is used to select and maintain the speed of each prime mover and hence the output frequency of the associated generator based on the electrical load on the busbar. In other words, the speed of each prime mover is varied automatically by the power management controller in response to detected changes in load demand. As noted above, this may also be expressed in terms of a frequency control function.

If two or more generators are connected in parallel to the busbar then the associated prime movers will be run at the same speed so that the frequency of the output voltage of each generator is the same and matches the system frequency. In this arrangement with parallel-connected generators then a load sharing function of the power management controller is used to determine load sharing between the generators for the selected speed. The load sharing can be determined with reference to the rating of each prime mover for the selected speed.

The power management controller will typically only control the speed of the prime mover of a generator that is connected to the busbar (i.e. those that are on-line). It is typically the responsibility of the generator auto-synchroniser to match the voltage, speed and hence phase of the generator output to the supply network before initiating closure of the associated circuit breaker. The auto-synchroniser can be a standard component forming part of the busbar or switchboard.

The speed control function can select the speed for each prime mover using a load profile, e.g. a profile which relates output power to speed or frequency. A load profile for each prime mover of the power distribution system can be stored within the power management controller.

The power management controller will typically keep the speed of each prime mover as low as possible to maximise efficiency, e.g. to minimise specific fuel oil consumption (SFOC), while meeting the current load demand and maintaining a suitable spinning reserve. The speed of each prime mover will only be increased if additional generating capability is needed to meet an increased load demand.

Controlling the speed of each prime mover to meet changing load demands means that the power distribution system no-longer operates with a fixed frequency. Any electrical load that is connected to the busbar must therefore be adapted to operate with a variable-frequency distribution voltage. Each electrical load can be connected to the busbar by an interposing power converter, optionally an active front end (AFE) power converter. In the case of a marine propulsion and distribution then the electrical load can be a propulsion motor of any suitable type and construction and can optionally be configured to drive a propeller shaft. The power distribution system can have any suitable number of propulsion motors or other electrical loads.

It will generally be preferred that each electrical load and any associated power converter will use conventional power system components where possible. This might include electrical switchboards that are specifically rated for fixed-frequency operation (e.g. for 50 or 60 Hz) depending on their particular application. In order to keep any power system components within their designed rating then it might be necessary to constrain the speed of each prime mover to be within certain limits. For example, a frequency range of 75-110% of the nominal system frequency might be exploited by the power management controller if the power distribution system uses conventional power system components. For marine power distribution and propulsion systems then possible frequency ranges of 95-105% and 90-110% of the nominal frequency for steady-state and transient operating conditions, respectively, might be suitable. Even small variations in the speed of each prime mover can provide useful improvements in the overall efficiency of the power distribution system. Busbars or switchboards and the associated circuit breakers are often rated for 50 or 60 Hz operation so operating at 50 Hz on a 60 Hz system realises a 17% reduction in operating frequency without considering any re-rating of the busbar components.

Each generator and power converter can be connected to the busbar by circuit breakers and associated controls or other switching means.

The speed of each prime mover will typically only be varied by the power management controller when a steady-state load has been maintained for a pre-determined period of time, e.g. 2 minutes. This ensures that the power management controller is not sensitive to any transient speed changes that can occur when there is a change in system load. Any transient speed changes can be corrected by the closed-loop speed control function of the speed controller of each prime mover and not by the power management controller. When the power management controller does request a change in the speed of each prime mover then it is accelerated or decelerated to the new selected speed. The ramp rates can be the same for each prime mover. A typical ramp rate for a diesel engine is about 1% rpm/s and this ramp rate is consistent over the wider speed range that is needed to implement the present invention. The power management controller will typically provide a new speed reference or setpoint to each speed controller, e.g. by means of the conventional speed raise or lower command signals, and will then wait a predetermined period of time for each prime mover to achieve the new speed before issuing any subsequent speed raise or lower command signals.

The power management controller can take into consideration the inertia of each prime mover when making a change in speed. For example, the speed raise or lower command signals issued by the power management controller can be limited to a maximum typical value of about 5% of rated speed per calculation. The maximum frequency change for a set of speed raise lower command signals will typically be configurable within the power management controller to suit the overall design of the power distribution system.

If the load demand increases then the power management controller can select a higher speed for each prime mover to meet the increased load demand or vice versa. The load sharing function of the power management controller can determine the load sharing based on the new selected speed. In other words, the individual generator load sharing references can be selected every time the speed of each prime mover is changed by the power management controller. It will be readily appreciated that these load sharing references will normally only change when there are two or more generators on-line with different load profiles.

If an increased load demand cannot be met by increasing the speed of the connected or on-line generator(s) then the power management controller can initiate the starting of one or more additional generators and connect them to the busbar. In other words, the power management controller can also include a conventional start/stop control function. Once any additional generators are on-line and have been connected to the busbar, the power management controller can, if necessary, vary the speed of each prime mover. For example, the connection of the one or more additional generators might allow the increased load demand to be met by operating each prime mover at a lower speed.

The power management controller can also initiate the unloading, disconnection and shutdown of one or more on-line generators. Once any generators have been disconnected from the busbar, the power management controller can, if necessary, vary the speed of each prime mover to meet the current load demand and maintain the required spinning reserve. For example, the disconnection of the one or more generators might require the load demand to be met by operating the remaining prime mover(s) at a higher speed. It will be readily appreciated that the overall efficiency of the power distribution system is still minimised even though the remaining prime mover(s) must be operated at a higher speed (and hence with higher fuel consumption) because one or more generators have been shutdown.

Typically, all generators connected to the busbar will be configured to start and run up to their respective rated speed before coming on-line. Only when a generator is properly connected to the power distribution system will the control functions of the power management system be applied and the desired speed selected.

Under certain circumstances, the power management controller may maintain each prime mover at its current speed even if the current loading would permit the speed to be reduced. For example, a power converter might be required to operate at a load that exceeds the current rating of its power electronics if the reduced speed operation results in the distribution voltage being lower than the nominal voltage level. The power converter will therefore be at its current limit and will request a voltage boost through the power management controller in order to meet the power requirement. The power management controller can use a voltage boost request signal from the power converter to increase the distribution voltage so that the power converter can operate at the required higher load. If voltage boost request signals are received from two or more power converters then the power management controller will typically use the highest boost request value when determining how the speed of each prime mover should be varied or adjusted. An important benefit of AFE power converters is that the dc link voltage (i.e. the voltage in the dc link between the first and second active rectifier/inverters) and hence the output voltage at the load side can be boosted if required to meet the load demand provided the input current to the power converter does not exceed its rating. This is true even if the power distribution system is operated at a reduced distribution voltage.

AFE power converters can enable each generator to operate at constant flux regardless of the speed of the associated prime mover. This means that a standard generator design can be used with the power distribution system of the present invention. By operating at constant flux, the output voltage of each generator will be reduced proportionally to the speed of the associated prime mover to ensure that the ampere-turns in the generator rotor remain constant.

Each generator will typically have an associated automatic voltage regulator (AVR) that can be adapted for constant flux (v/f) control. This ensures that the output voltage of each generator is reduced proportionally with speed.

Each AVR can operate in droop control so that the output voltage of the associated generator has a droop characteristic that is proportional to reactive (kVA) load on the generator (typically 2%). This ensures stable reactive load sharing between generators.

A conventional power management controller would normally include a voltage control function. However, because the output voltage of each generator will vary during normal operation of the power distribution system as a result of the changes in selected speed of the associated prime mover, the conventional voltage control function is not needed. The power management controller will only be responsible for determining the reactive load sharing reference for each generator. The reactive load sharing control function will be similar to the conventional load sharing control function described above for the speed controllers. However, the power management system will monitor reactive power using transducers in the busbar or switchboard as opposed to active power and will control the excitation of each generator(s) through the associated AVR.

The power management controller can determine the reactive load and hence the reactive kVA capability for each generator based on its operating speed and output voltage assuming a constant power factor.

The power distribution system can include electrical switchgear that is adapted for variable-frequency operation.

The power distribution system can include a second ac busbar adapted to carry a fixed-frequency ac distribution voltage. This ensures that conventional distribution equipment such as pumps, motors, fans etc. and in appropriate cases, marine vessel services, can be connected to the power distribution system. The first and second ac busbars can be connected together by at least one power converter and an optional transformer (e.g. a step-down transformer). In other words, the fixed-frequency ac distribution voltage can be derived from the variable-frequency ac distribution voltage that is carried by the first ac busbar by means of the interposing power converter. Each power converter can be an AFE power converter adapted to provide a fixed-frequency output and rated for the distribution equipment.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 8:
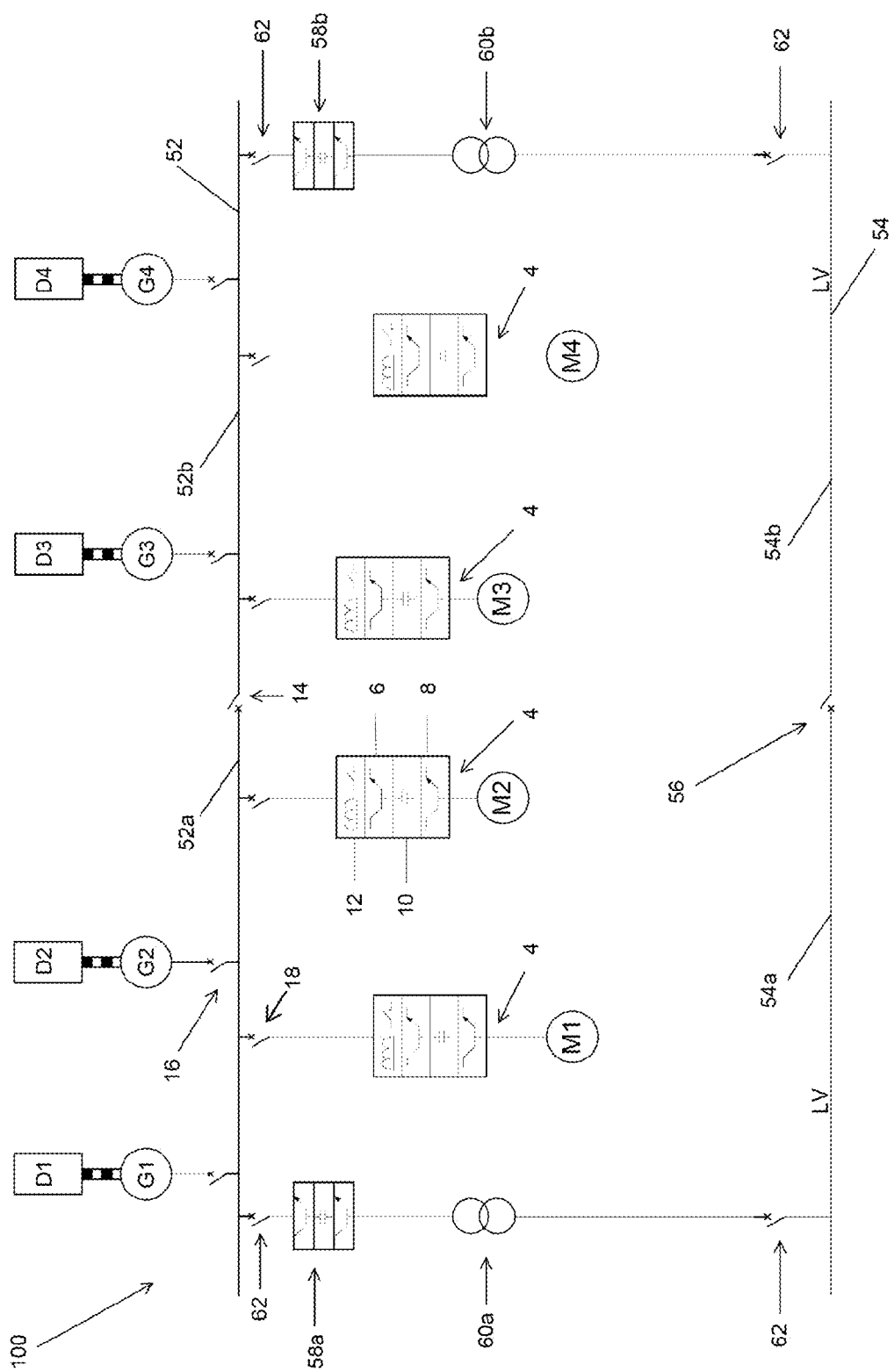
FIG. 8 is a schematic diagram showing a marine power distribution and propulsion system according to the present invention.

A marine power distribution and propulsion system 100 according to the present invention is shown in FIG. 8. Although the following description concentrates on systems for marine vessels, it will be readily appreciated that other power distribution systems can be implemented in a similar manner.

Figure 1:
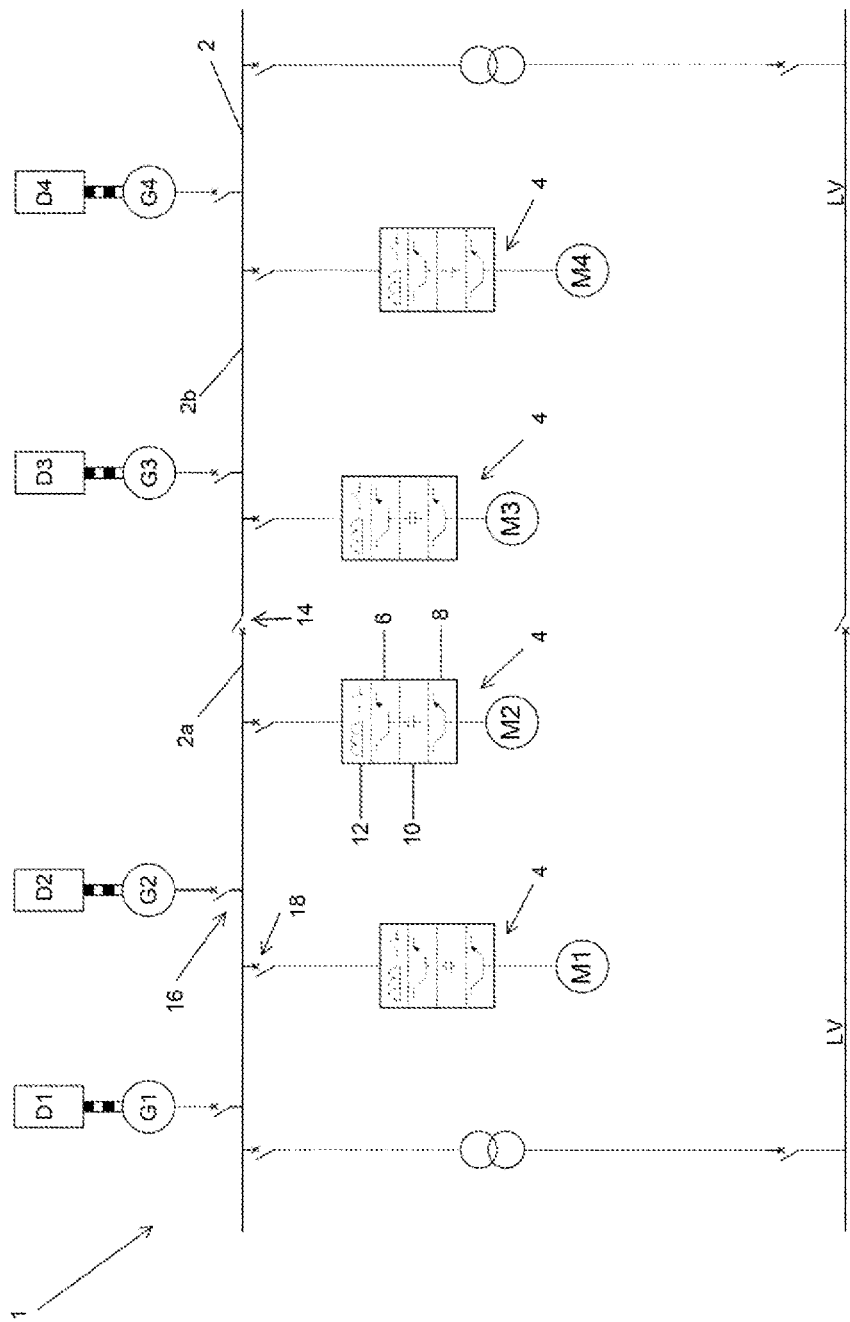
FIG. 1 is a schematic diagram showing a conventional marine power distribution and propulsion system.

The overall marine power distribution and propulsion system 100 is similar to the one shown in FIG. 1 and it will be understood that any suitable number and type of ac generators, propulsion motors etc. can be used. Like components have been given the same labels or reference numerals.

A plurality of ac generators G1 . . . G4 provide ac power to a busbar 52 which carries a variable-frequency distribution voltage (e.g. 690 V but other system voltages can be used). The generators G1 . . . G4 are associated with diesel engines D1 . . . D4 but other types of prime mover can be used.

Electric propulsion motors M1 . . . M4 are connected to the busbar 52 by means of interposing active front end (AFE) power converters 4. The propulsion motors M1 . . . M4 can be of any suitable type and construction and can optionally be configured to drive a propeller shaft or other propulsion system such as a thruster. In alternative power distribution systems then other electrical loads might be connected to the AFE power converters.

Each AFE power converter 4 is configured as described above in connection with the marine power distribution and propulsion system of FIG. 1.

The busbar 52 is equipped with protective switchgear with circuit breakers and associated controls. The busbar 52 is divided into a pair of busbars sections 52a, 52b (e.g. port and starboard) that are interconnected by a tie 14. The actual arrangement of the power distribution system will typically depend on redundancy, which is particularly important for marine vessels.

The generators G1 . . . G4 and power converters 4 can be connected to the busbar 52 by circuit breakers 16, 18 and associated controls or other switching means.

A second busbar 54 carries fixed-frequency distribution voltage (e.g. 480 V, 60 Hz but other system voltage and frequencies can be used). The second busbar 54 is equipped with protecting switchgear with circuit breakers and associated controls. The second busbar 54 is divided into a pair of busbar sections 54a, 54b (e.g. port and starboard) that are interconnected by a tie 56. The first busbar sections 52a, 54a are connected together by a first AFE power converter 58a and a first step-down transformer 60a and the second busbar sections 52b, 54b are connected together by a second AFE power converter 58b and a second step-down transformer 60b. The AFE power converters 58a, 58b and the step-down transformers 60a, 60b are connected to the respective busbar by circuit breakers 62 and associated controls or other switching means.

Figure 9:
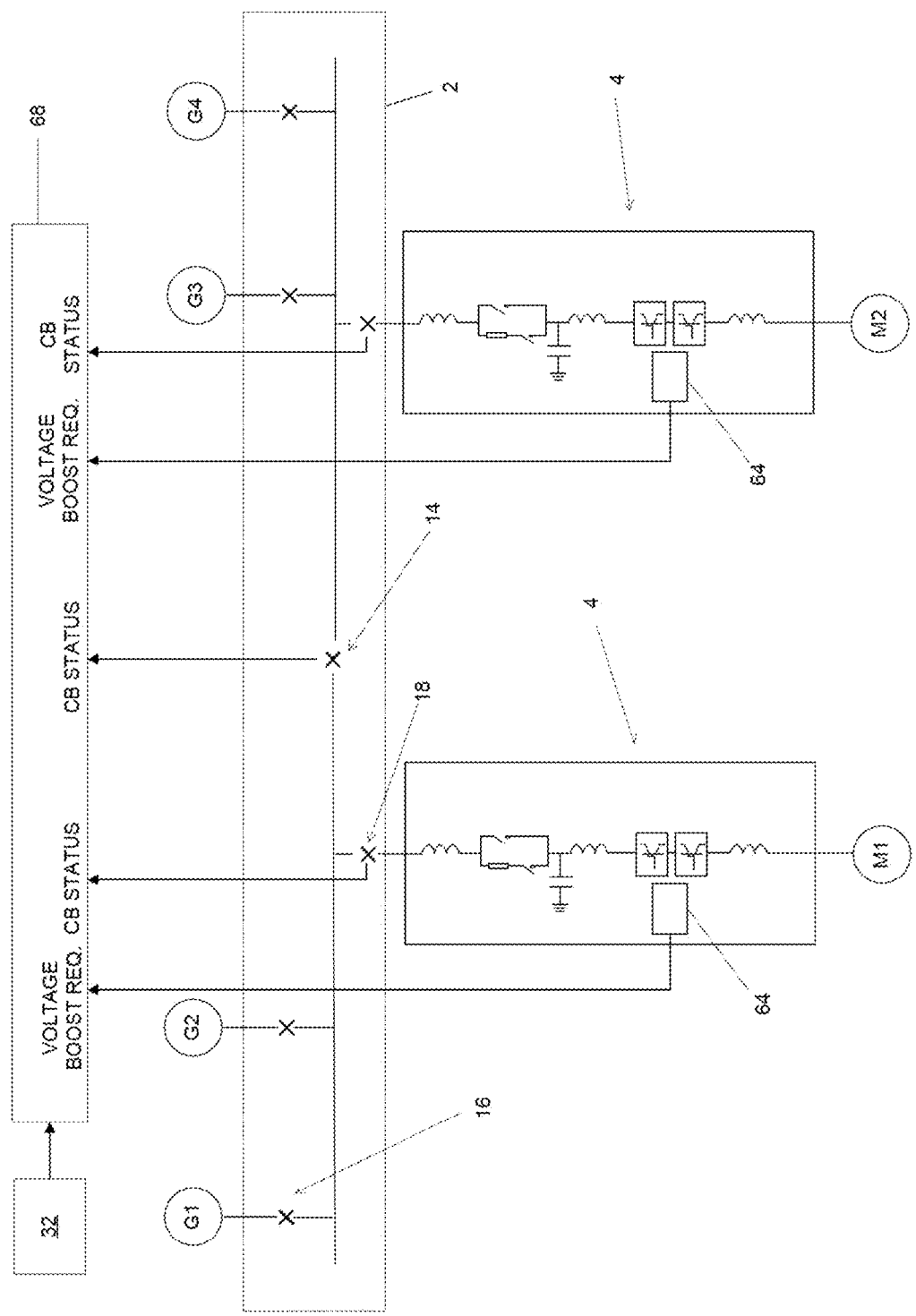
FIG. 9 is a schematic diagram showing how active front end (AFE) power converters issue voltage boost request signals to the power management controller of the present invention.

With reference to FIG. 9, each AFE power converter 4 includes a controller 64 that can provide a voltage boost request signal to a modified power management controller 66 as described in more detail below.

Figure 10:
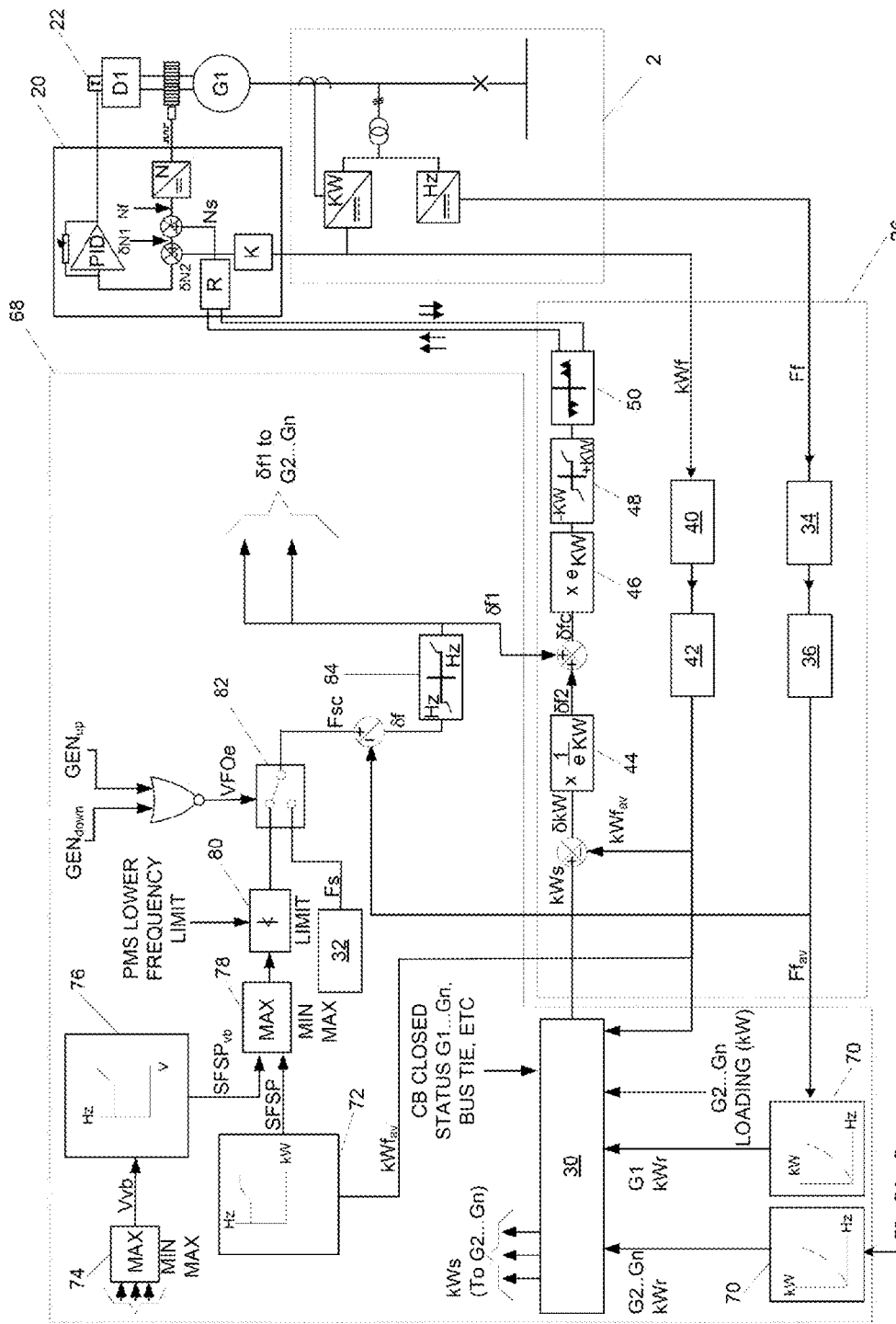
FIG. 10 is a schematic diagram showing control functions of the power management controller of FIG. 9.

With reference to FIG. 10, each diesel engine D1 . . . D4 is provided with an electronic speed controller 20 that operates as described above in connection with the marine power distribution and propulsion system of FIGS. 1 to 3.

Figure 2:
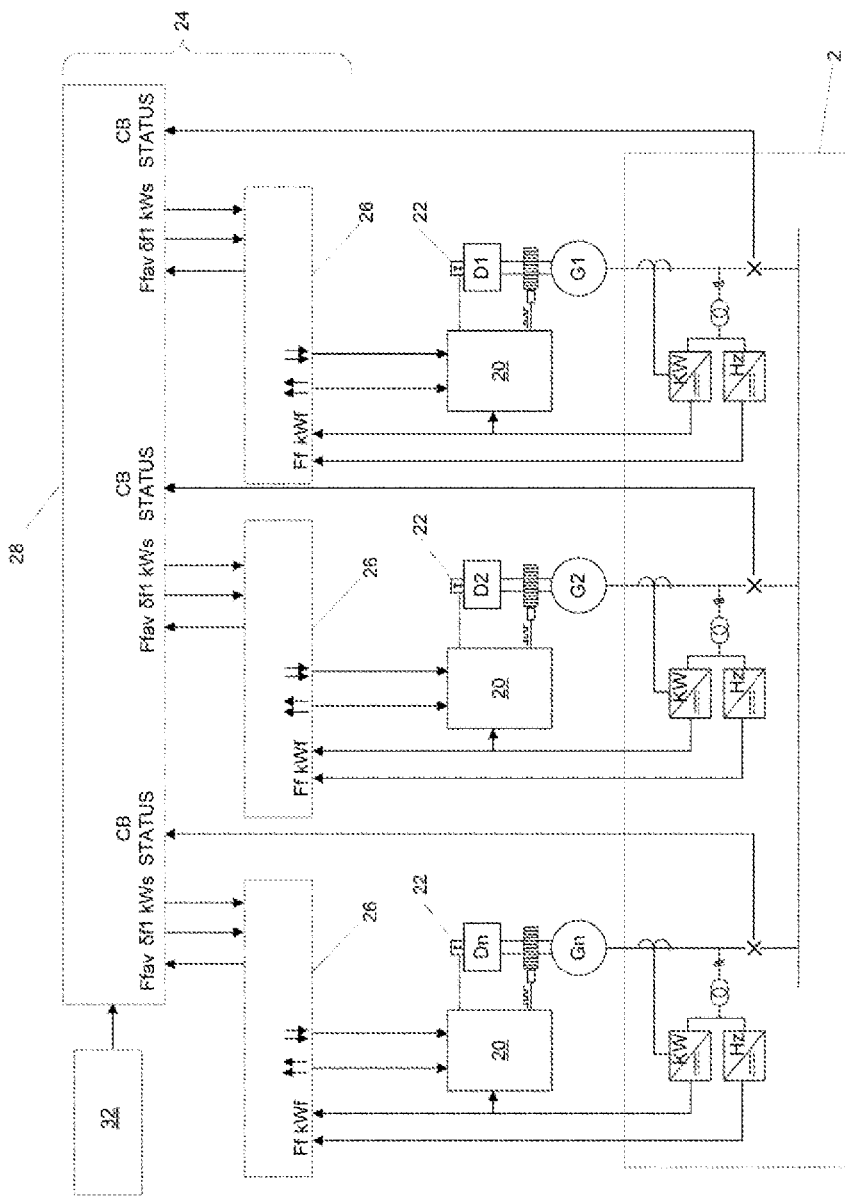
FIG. 2 is a schematic diagram showing a power management controller for the conventional marine power distribution and propulsion system.
Figure 3:
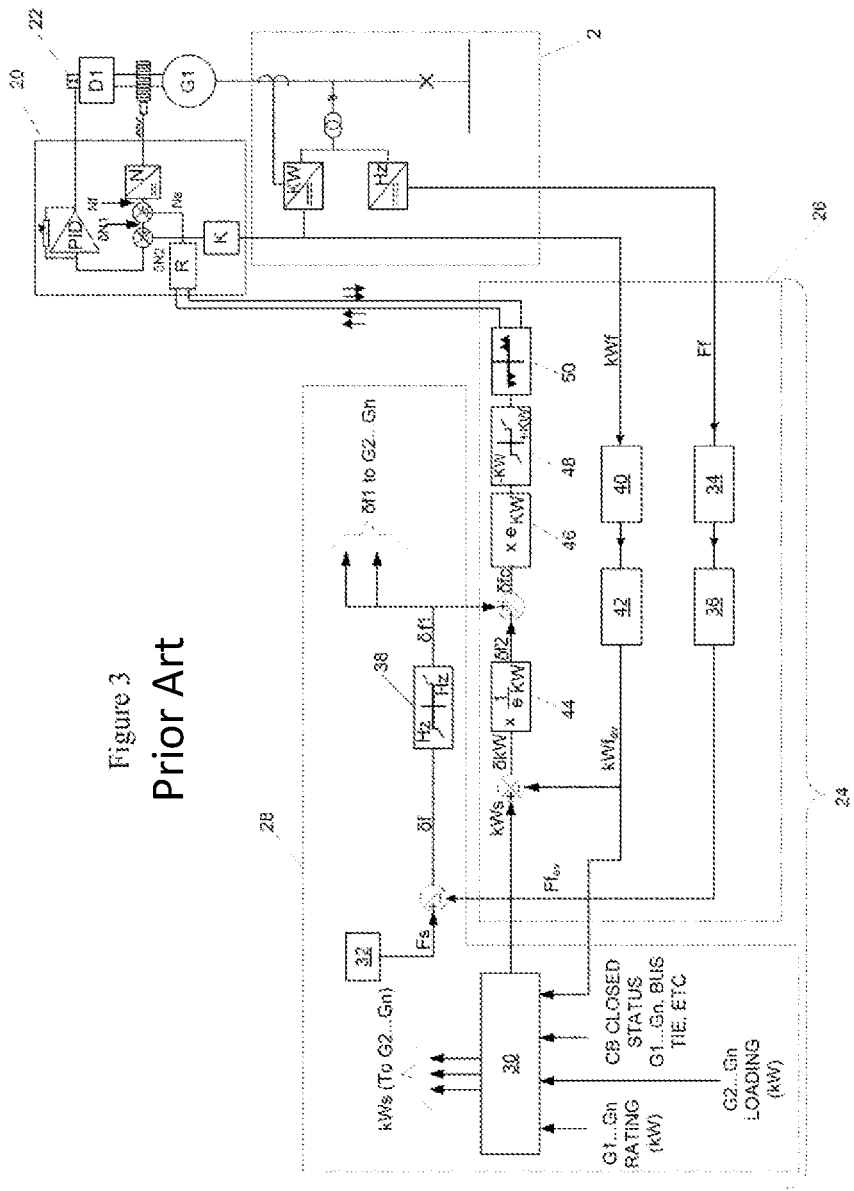
FIG. 3 is a schematic diagram showing control functions of the power management controller of FIG. 2.
Figure 4:
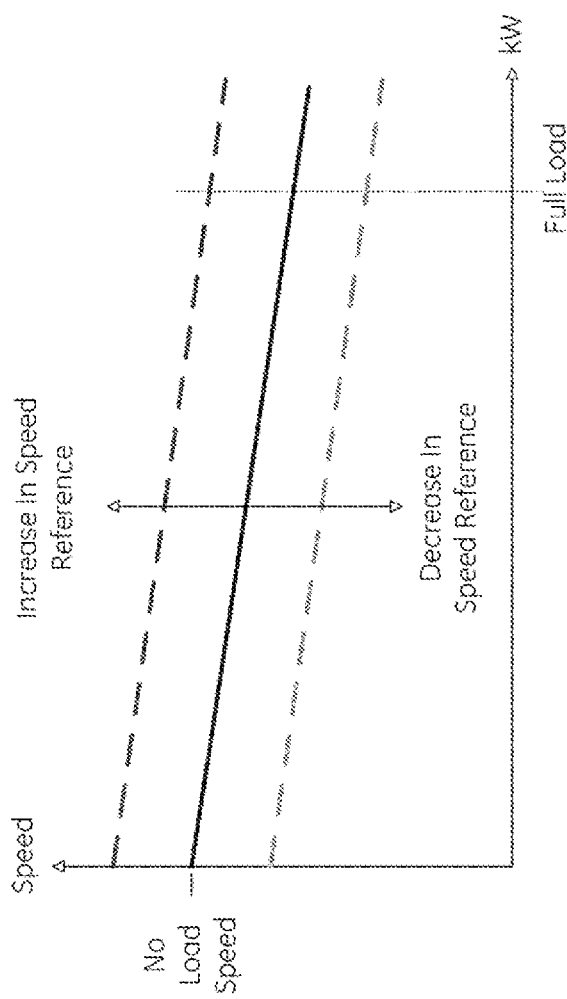
FIG. 4 is a diagram showing the speed droop characteristic for a single generator.
Figure 5:
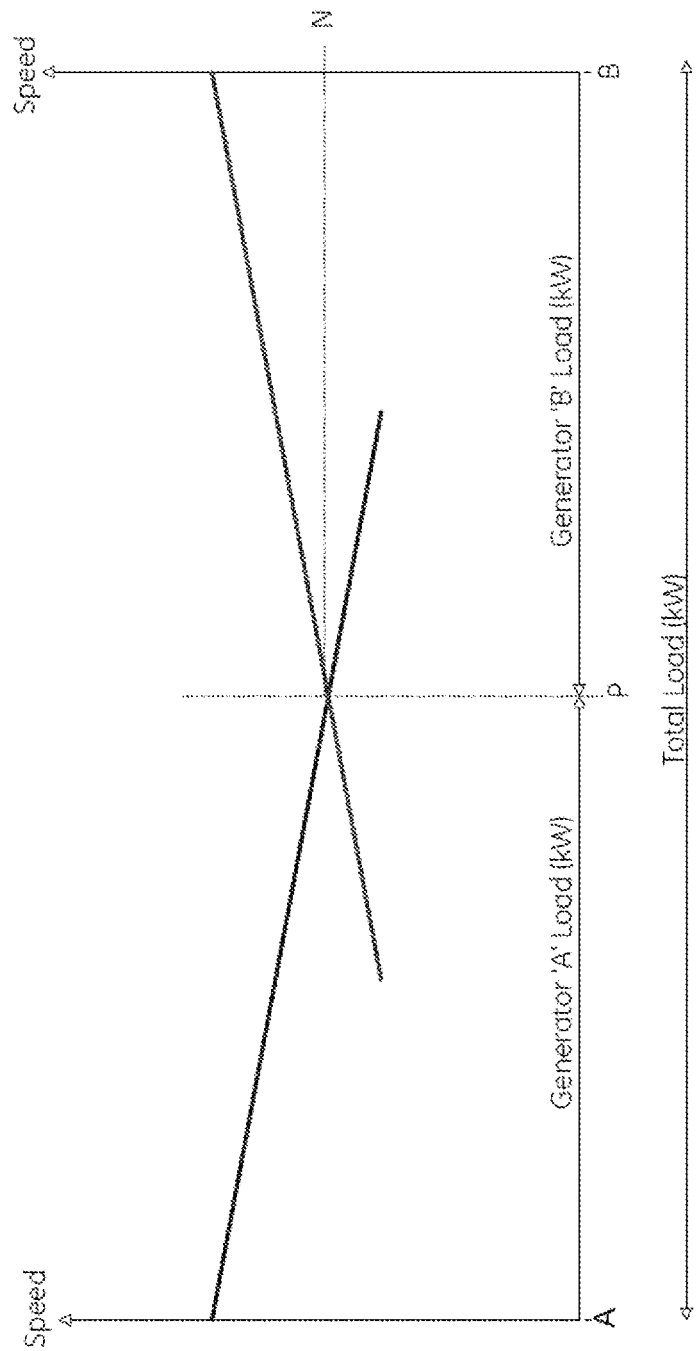
FIG. 5 is a diagram showing the speed droop characteristic for two generators operating in parallel with the same speed reference or setpoint.
Figure 6:
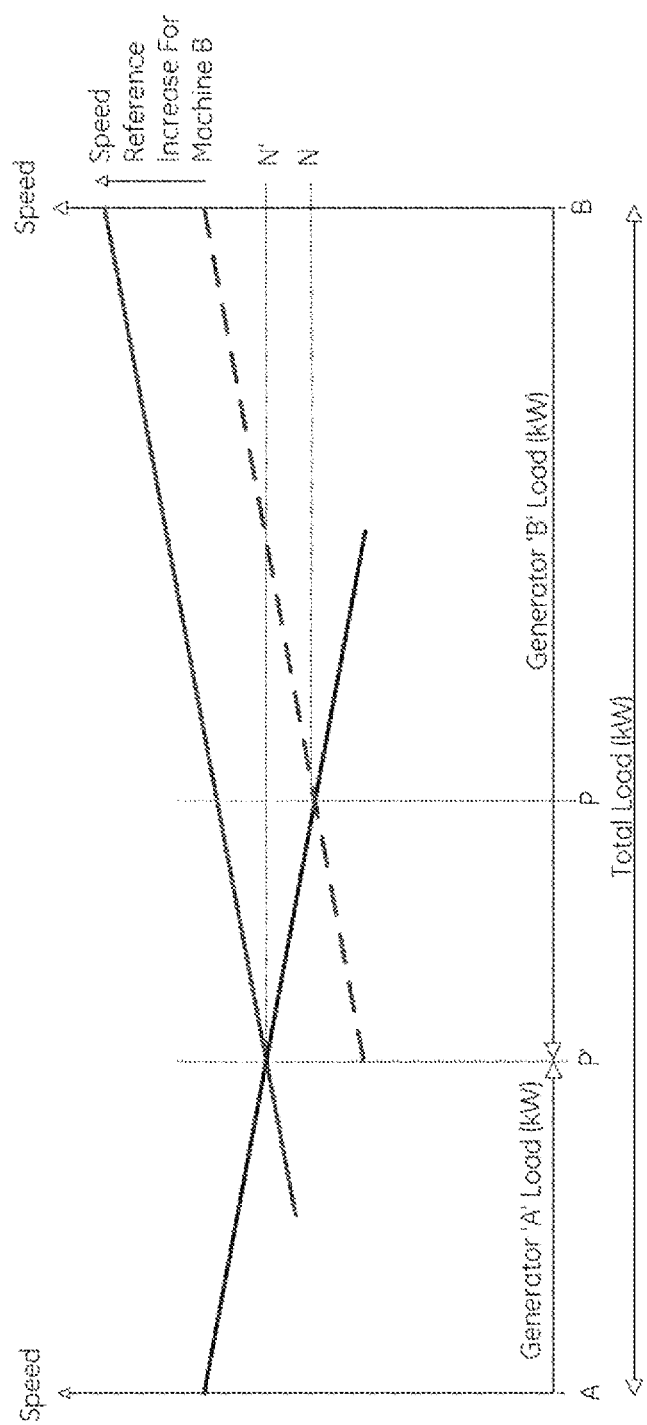
FIG. 6 is a diagram showing the speed droop characteristic for two generators operating in parallel with a different speed reference or setpoint.

The modified power management controller 66 (or power management system (PMS)) can carry out all of the control functions described above in connection with the marine power distribution and propulsion system of FIGS. 1 to 3, and in particular has the same generator-specific control functions that are grouped together in the generator-specific controllers 26. However, the common control functions that are grouped together in the common controller 68 are modified to accommodate variable speed and hence variable frequency operation. The generator-specific and common controllers 26, 68 can be implemented as two independent controllers but it is possible to integrate the functionality of the controllers on to one physical controller. Similarly, the functionality could be spread across more than two controllers if this is convenient to the practical implementation of the power management controller 66.

It will be readily appreciated that the common control functions include the start/stop control function described above, together with other functions such as the automatic removal or load-shedding of non-essential loads under overload conditions etc. However, for clarity only a modified load sharing control function and a frequency (or speed)

control function are shown in FIG. 10 because these are the most relevant to the present invention.

Although the various control functions of the power management controller 66 are described in terms of frequency control, it will be understood that control of the system frequency is directly related to the speed control of each diesel engine for the reasons described above. In practice, one of the generator-specific control functions is to convert any frequency error (whether a derived frequency error due to a corresponding load sharing error or a system frequency error) to a speed error for the speed controllers 20 of the corresponding diesel engines D1 . . . D4.

The modified load sharing control function uses information data indicative of the number of generators that are on-line, their actual loading—to determine the total system load, together with other operational parameters of the power distribution system such as the number of operational busbar sections and the open/closed status of the circuit breakers ('CB STATUS') or protective switchgear. It also uses information data about the individual generator rating through a kW/Hz profile for each generator that relates load capability to frequency (or speed). The averaged frequency feedback signal $Ff_{av}$ from the generator-specific controller 26 of each generator is used as a pointer to the kW/Hz profile 70. In other words, the averaged frequency feedback signal $Ff_{av}$ for the first generator G1 is used as a pointer to the kW/Hz profile for the first generator, the averaged frequency feedback signal $Ff_{av}$ for the second generator G2 is used as a pointer to the kW/Hz profile for the second generator and so on. The kW/Hz profile 70 for each generator G1 . . . G4 has a frequency range and hence a corresponding speed range of 0.75 to 1.0 pu.

The information data is provided to a load share function block 30 which calculates an active power (kW) reference or setpoint kWs and a reactive power (kVAr) reference or setpoint (not shown in FIG. 10) based on the power distribution system configuration as described above.

The frequency control function uses the averaged active power feedback signal $kWf_{av}$ from the generator-specific controller 26 of each generator (or a single generator if the ratings and characteristics are identical) as a pointer to a kW/Hz profile 72 with a frequency range of 0.75 to 1.0 pu. The output of the kW/Hz profile 72 is a minimum system frequency reference or setpoint SFSP. For non-identical generator configurations, the kW/Hz profile 72 will be selected to allow for the generator with the minimum frequency reduction capacity. In practice, the minimum system frequency reference SFSP is indicative of the minimum system frequency that meets the current load demands on the busbar 2 and has a minimum value of 0.75 pu.

As noted above, each AFE power converter 4 can initiate a voltage boost signal request. The voltage boost request signals are supplied to a min/max function block 74 where the highest is selected. The highest voltage boost signal Vvb that is selected by the min/max function block 74 is used as a pointer to a V/Hz profile 76 with a frequency range of 0.75 to 1.0 pu to derive the minimum system frequency reference or setpoint SFSPvb and hence the minimum voltage boost that is needed to allow the AFE power converter(s) 4 to achieve the desired power.

The respective system frequency references SFSP and SFSPvb are supplied to a min/max function block 78 where the highest of the references is selected. In practice this means that the system frequency reference SFSP will be used to control the system frequency unless a voltage boost is needed.

The output of the min/max function block 78 represents the minimum required system frequency which is then compared against a lower limit value in a limit function block 80, the lower limit value being derived by the power management controller 66 to ensure a minimum spinning reserve. The lower limit value can be set by an operator. It follows that a reduction in system frequency results in a reduction in generator load capacity. This is recognised by the power management controller 66 and sets a lower frequency limit to ensure that the minimum spinning reserve is maintained at all times during operation of the marine power distribution and propulsion system 100.

The output of the limit function block 80 is supplied to a changeover function block 82 which allows either fixed- or variable-frequency control to be selected. The changeover function can be controlled by the power management controller 66 and variable-frequency operation is typically only selected if any generator is not loading up or unloading. This ensures that variable-frequency control is only enabled when all generators on a common busbar are load sharing. The output of the changeover function block 82 is a frequency reference Fsc which is either determined by the output of the limit function block (for variable-frequency operation) or by a frequency reference Fs that is set by the operator (for fixed-frequency operation) through a workstation 32. In other words, if a generator is being loaded up or unloaded (i.e. in a 'load-up' condition) then the variable-frequency control is temporarily suspended and the system frequency is determined by the frequency reference Fs. Variable-frequency operation can also be suspended in other circumstances, such as during a fault condition, for example.

The frequency reference Fsc is compared against the averaged frequency feedback signal $Ff_{av}$ and the resulting frequency error signal δf is applied to a deadband function block 84, typically set at about 0.2 Hz. The output of the deadband function block 84 is a frequency control signal δf1 that is distributed for use in the generator-specific controllers 26 of the power management controller 66 as described above in connection with the marine power distribution and propulsion system shown in FIGS. 1 to 3. The only difference is that the active power reference kWs that is used by each generator-specific controller 26 takes into account the individual generator ratings through the kW/Hz profiles 70 described above. In other words, the derivation of the speed raise or lower command signals that are provided to the associated speed controller 20 and converted to the analogue speed reference or setpoint Ns takes into account the frequency control that is applied by the common controller 68 of the power management controller 66.

Since the speed raise or lower command signals are provided by the generator-specific controllers 26, it is possible that each speed controller 20 will receive a different speed reference or setpoint Ns. However, the generator-specific controller 26 associated with each diesel engine D1 . . . D4 will always be working to achieve the overall objective that is set and maintained by the common control functions of the power management controller 66.

The following is a possible example of how the power management controller 66 might operate in practice.

The marine power and propulsion system 100 is operating in a 'transit' mode, i.e. travelling between locations. The overall load demands require a single generator G1 to be on-line. The propulsion load increases until the generator G1 is operating at more than 90% of its rated power and the spinning reserves of the system fall below the pre-set minimum value.

The power management controller 66 therefore initiates the starting, synchronisation and loading of a second generator G3. Once the second generator G3 has been placed on-line, the power management controller 66 recalculates the load share reference or setpoint for each generator. Because the second generator G3 is now in a 'load-up' condition, the variable-frequency operation of the marine power distribution and propulsion system is temporarily suspended by the power management controller 66 and the system frequency is determined by the frequency reference Fs that is set by the operator.

The common controller 68 will distribute a new frequency control signal (or first frequency error signal) δf1 and a new active power reference kWs to the generator-specific controllers 26 of the first and second generators G1, G3 resulting in a second frequency error signal δf2 being calculated in each generator-specific controller.

Several control functions will therefore be happening at the same time. For example, the speed reference that is applied to the speed controller 20 of the first generator G1 will be decreasing while the speed reference that is applied to the speed controller of the second generator G3 will be increasing. Therefore the speed raise and lower command signals provided to the respective speed controllers 20 by the generator-specific controllers 26 will be a combination of the frequency error and the active power load sharing error.

Once stable load sharing has been achieved for both generators (i.e. the averaged active power feedback signal $kWf_{av}$ substantially equals the active power reference kWs from the common controller 68), variable-frequency operation will be re-established by the power management controller 66 because none of the generators are loading up or unloading. The common controller 68 will monitor the system frequency by means of the kW/Hz profile 72 and will demand a new system frequency reference or setpoint SFSP as long as a lower frequency limit is not in place. The common controller 68 will distribute a new frequency control signal δf1 to the generator-specific controllers 26. The diesel engines D1, D3 associated with the first and second generators G1, G3 will then be controlled to decelerate to match the new system frequency by means of speed lower command signals which are applied by the respective generator-specific controllers 26.

With the first and second generators G1, G3 operating at a lower output frequency that matches the new system frequency, the load share function block 30 will re-calculate the active power reference for both generators—it being understood that this would only change if the generators had different kW/Hz profiles 70. The system capacity and hence the spinning reserve for the lower system frequency is also re-calculated.

Figure 7:
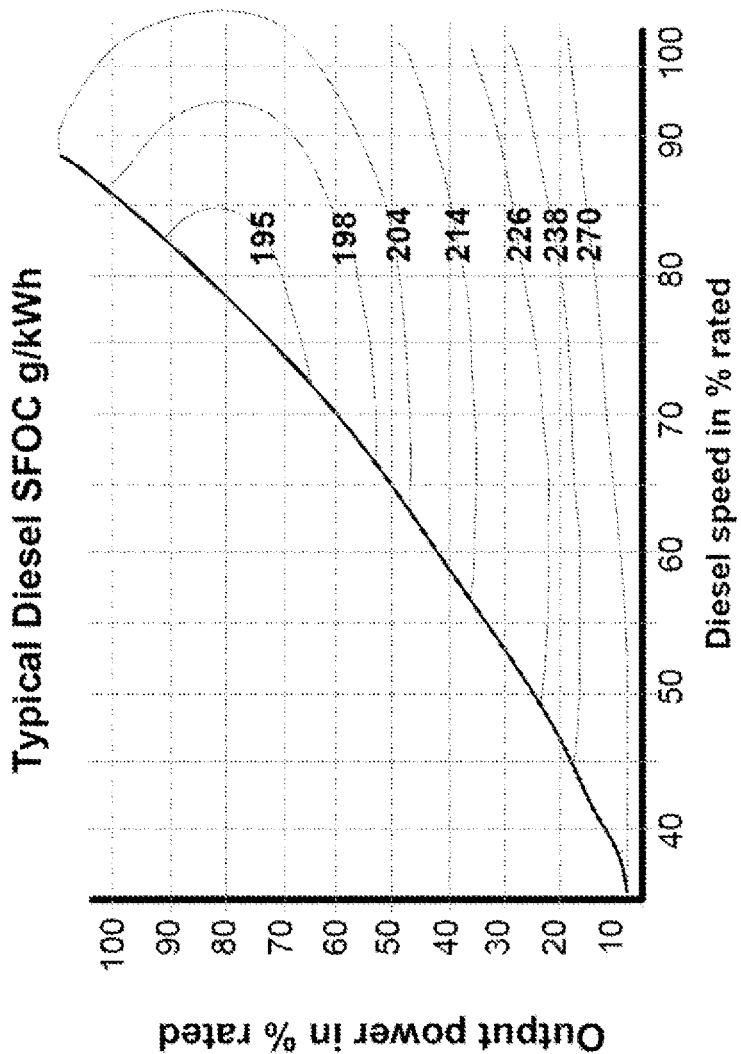
FIG. 7 is a graph showing typical specific fuel oil consumption (SFOC) for a diesel engine.

From the SFOC curve shown in FIG. 7 it can be seen that for this particular example the SFOC for each diesel engine D1, D3 would reduce from about 215 g/kWh to about 205 g/kW/h—a 5% reduction in fuel oil consumption when operating under variable frequency (or speed) control.

If an increase in power converter load (e.g. propulsion motor or thruster) is requested but the power converter current rating is exceeded because the marine power distribution and propulsion system is operating at a reduced frequency, and hence at a reduced voltage, the power converter 4 will request a voltage boost. The common controller 66 will respond by increasing the system frequency and hence the distribution voltage carried by the busbar 2 to meet the increased load demand.

Figure 11:
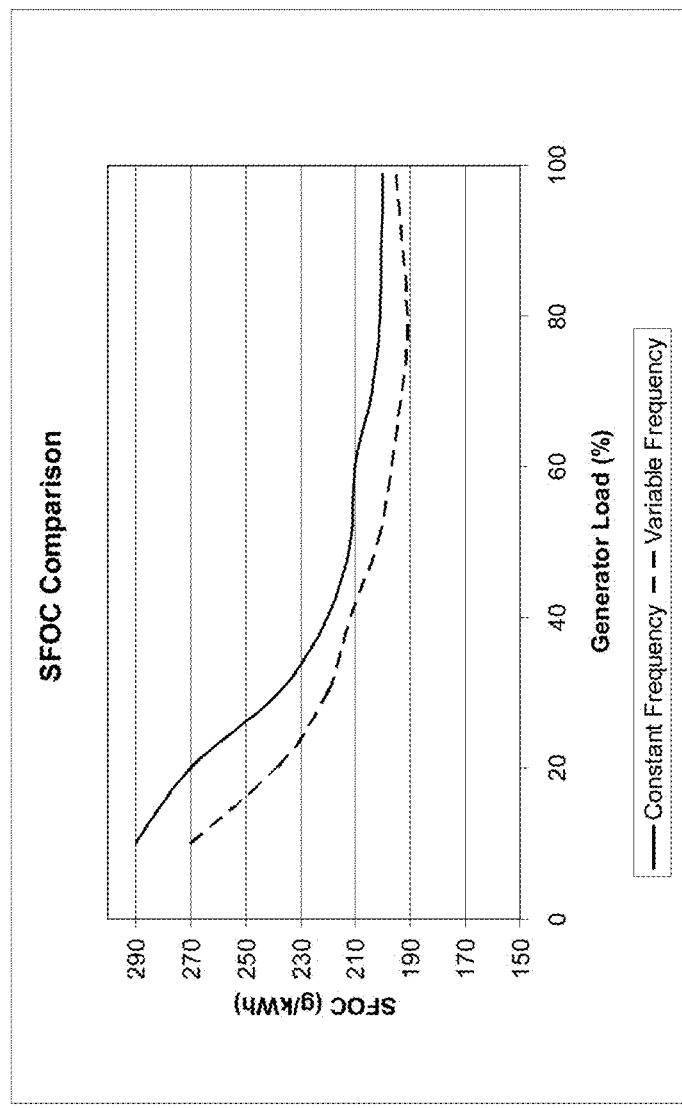
FIG. 11 is a graph showing a comparison of SFOC for fixed- and variable-frequency systems.

FIG. 11 shows a fuel consumption graph based on a power distribution system with four ac generators each having a 2 MW rating and with a generator load dependent start threshold set at 90% generator rating. It can be seen that under certain load conditions a reduction in SFOC as high as 15% can be achieved. However, it is expected that reductions of about 5% would be realistic for most systems.

Figure 12:
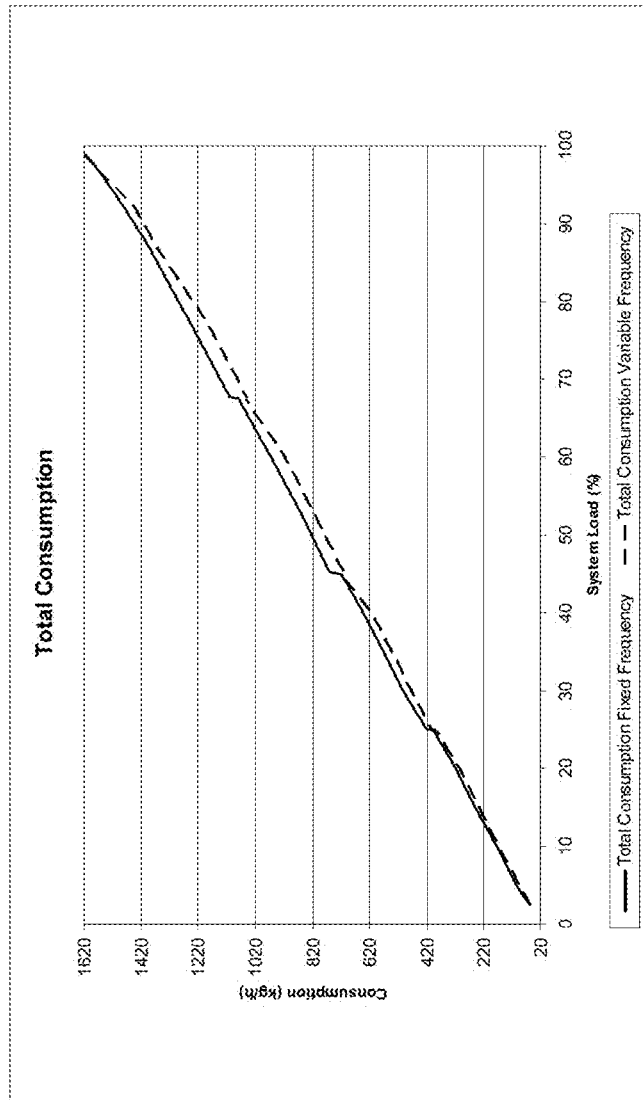
FIG. 12 is a graph showing a comparison of total fuel consumption for fixed- and variable-frequency systems.

FIG. 12 compares total fuel consumption for fixed- and variable-frequency systems. It can be seen that operating the power distribution system with variable-frequency operation leads to a reduction in total consumption.

What is claimed is:

1. A power distribution system comprising:
   an ac busbar adapted to carry a variable-frequency ac distribution voltage;
   an ac generator connected to the ac busbar and having an associated prime mover;
   at least one additional ac generator connected to the ac busbar, each additional ac generator having an associated additional prime mover; and
   a power management controller configured to:
   (i) store load profiles corresponding to the associated prime movers, wherein the load profiles relate output power to speed or frequency for the corresponding prime movers,
   (ii) detect a change in an electrical load on the ac busbar,
   (iii) select a new system frequency as the variable-frequency ac distribution voltage on the ac busbar, based on the the change in the electrical load detected and the load profiles stored,
   (iv) automatically vary the rotational speed of the prime movers based on the change to the electrical load detected based on the load profiles stored, and
   (v) vary a frequency of the output voltages of each of the ac generators to the ac busbar to match the new system frequency during normal operation of the power distribution system.

2. The power distribution system of claim 1, further comprising a speed controller associated with the prime mover and wherein the power management controller uses the speed controller to vary and maintain the speed of the prime mover.

3. The power distribution system of claim 1, wherein the power management controller includes a speed control function to select and maintain the speed of the prime mover, and hence the output frequency of the generator, based on the electrical load on the busbar such that the speed of the prime mover is varied automatically by the power management controller in response to detected changes in load demand.

4. The power distribution system of claim 3, wherein the speed control function selects the speed of the prime mover using a load profile which relates output power to speed or frequency.

5. The power distribution system of claim 3, wherein the speed control function varies the speed of the prime mover only when a steady-state load has been maintained for a pre-determined period of time.

6. The power distribution system of claim 1, further comprising two or more ac generators connected to the busbar, each having an associated prime mover, and wherein the power management controller includes a load sharing control function such that the load sharing between the generators is varied automatically by the power management controller with reference to the speed of the prime movers.

7. The power distribution system of claim 6, wherein the power management controller is further adapted to vary the speed of each prime mover once any additional generators are on-line and connected to the busbar or once any generators have been disconnected from the busbar.

8. The power distribution system of claim 6, wherein the output voltage of each generator is varied with reference to the speed of its associated prime mover and each generator comprises an automatic voltage regulator (AVR) adapted for constant flux control.

9. The power distribution system of claim 1, wherein the power management controller is further adapted to initiate the starting of one or more additional ac generators and connect them to the busbar.

10. The power distribution system of claim 9, wherein the power management controller is further adapted to initiate the unloading, disconnection and shutdown of one or more on-line generators.

11. The power distribution system of claim 1, wherein the power management controller is further adapted to temporarily suspend the variable-frequency operation when the generator is being loaded up or unloaded such that the speed of the prime mover is maintained at a selected speed.

12. The power distribution system of claim 1, further comprising an electrical load connected to the busbar by means of a power converter.

13. The power distribution system of claim 12, wherein the power converter is an active front end power converter.

14. The power distribution system of claim 12, wherein the power management controller is further adapted to vary the speed of the associated prime mover in response to a voltage boost request signal from the power converter.

15. The power distribution system of claim 12, wherein the electrical load is a propulsion motor or a thruster motor.

16. The power distribution system of claim 1, further comprising a second ac busbar adapted to carry a fixed-frequency ac distribution voltage, the first and second busbars being connected together by at least one power converter and an optional transformer.

17. The power distribution system of claim 16, wherein the at least one power converter is an active front end power converter adapted to provide a fixed-frequency output.

18. A method of operating a power distribution system comprising an ac busbar adapted to carry a variable-frequency ac distribution voltage, and a plurality of ac generators connected to the ac busbar and each having an associated prime mover, and a power management controller; the method comprising:

storing load profiles corresponding to the associated prime movers, wherein the load profiles relate output power to speed or frequency for the corresponding prime movers;

detecting a change in an electrical load on the ac busbar;

selecting a new system frequency as the variable-frequency ac distribution voltage on the ac busbar, based on the the change in the electrical load detected and the load profiles stored;

automatically varying the rotational speed of the prime movers based on the change to the electrical load detected based on the load profiles stored; and varying a frequency of the output voltages of each of the ac generators to the ac busbar to match the new system frequency during normal operation of the power distribution system.

* * * * *